(12) United States Patent
Abraham et al.

(10) Patent No.: US 8,874,946 B2
(45) Date of Patent: Oct. 28, 2014

(54) CONTROL FOR ELECTRICALLY ISOLATING POWER SUPPLY FROM EXTERNAL SOURCE WITH MOMENTARY SWITCH AND LATCHING RELAY CONTROLLED BY SIGNAL GENERATED FROM POWER SUPPLY VOLTAGE

(75) Inventors: Benjamin Abraham, Los Gatos, CA (US); Robert Campesi, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 450 days.

(21) Appl. No.: 13/259,132

(22) PCT Filed: Apr. 21, 2009

(86) PCT No.: PCT/US2009/041226
§ 371 (c)(1),
(2), (4) Date: Sep. 22, 2011

(87) PCT Pub. No.: WO2010/123496
PCT Pub. Date: Oct. 28, 2010

(65) Prior Publication Data
US 2012/0017103 A1 Jan. 19, 2012

(51) Int. Cl.
*G06F 1/32* (2006.01)
*G06F 1/26* (2006.01)
(52) U.S. Cl.
CPC ... *G06F 1/32* (2013.01); *G06F 1/26* (2013.01)
USPC .......................................... 713/320; 713/300

(58) Field of Classification Search
CPC ............. G06F 1/26; G06F 1/263; G06F 1/32; G06F 1/3234
See application file for complete search history.

(56) References Cited

U.S. PATENT DOCUMENTS

| 5,432,387 | A | * | 7/1995 | Kogure et al. | 307/328 |
|---|---|---|---|---|---|
| 5,815,409 | A | * | 9/1998 | Lee et al. | 700/286 |
| 5,850,559 | A | * | 12/1998 | Angelo et al. | 713/320 |
| 5,918,059 | A | | 6/1999 | Tavallaei | |
| 5,923,099 | A | | 7/1999 | Bilir | |
| 6,240,520 | B1 | * | 5/2001 | Cha | 713/310 |
| 6,625,739 | B1 | * | 9/2003 | Kobayashi | 713/310 |
| 6,661,123 | B2 | * | 12/2003 | Hsu | 307/141 |
| 6,933,686 | B1 | | 8/2005 | Bishel | |
| 7,120,812 | B2 | * | 10/2006 | Teradaira et al. | 713/340 |

(Continued)

FOREIGN PATENT DOCUMENTS

KR 100619880 9/2006

OTHER PUBLICATIONS

ISA/KR, international Search Report dated May 27, 2010, PCT/US2009/041226 filed Apr. 21, 2009.

(Continued)

*Primary Examiner* — Kenneth Kim

(57) ABSTRACT

A system includes a power supply and a power switch to connect an external power source that is external to the system to the power supply. The power switch has an on position and an off position. The power switch if actuated to the off position causes the system to be electrically isolated from the external power source. A control circuit is responsive to actuation of the power switch to provide a signal to cause software control of a power state of the system.

15 Claims, 4 Drawing Sheets

(56) References Cited

U.S. PATENT DOCUMENTS

| | | | |
|---|---|---|---|
| 7,315,097 B2 | 1/2008 | Tajika | |
| 7,765,416 B2 * | 7/2010 | Zhou | 713/320 |
| 8,689,030 B2 * | 4/2014 | Higuma et al. | 713/324 |
| 2005/0223245 A1 | 10/2005 | Green | |
| 2006/0022635 A1 | 2/2006 | Li et al. | |
| 2006/0282703 A1 | 12/2006 | Nam | |
| 2011/0161686 A1 * | 6/2011 | Kumagaya | 713/300 |

OTHER PUBLICATIONS

Powering Up a REO Appliance and Shutting It Down (for REO 1000 and REO 4000) (2 pages), dated on or before Mar. 22, 2009.

Troubleshooting—Power Subsystem, HP Integrity rx2660 Server: User Service Guide, Published Nov. 2007 (2 pages).

* cited by examiner

CONTROL FOR ELECTRICALLY ISOLATING POWER SUPPLY FROM EXTERNAL SOURCE WITH MOMENTARY SWITCH AND LATCHING RELAY CONTROLLED BY SIGNAL GENERATED FROM POWER SUPPLY VOLTAGE

CROSS-REFERENCE TO RELATED APPLICATION

This application is a national stage application under 35 U.S.C. §371 of PCT/US2009/041226, filed Apr. 21, 2009.

BACKGROUND

Modern computers such as desktop computers, server computers, and so forth, can be powered by plugging the computers into external power sources, such as wall outlets that supply alternating current (AC) power, When computers are not in use, power saving features are usually provided to automatically transition the computers to a low power mode (such as a hibernation mode). Alternatively, users who do not plan to use their computers for some amount of time may decide to shut off the computers.

However, even when computers are shut off or in hibernation mode, such computers can still draw power from external power sources, which can be wasteful of power resources. The cumulative effect of potentially millions of computers continuing to draw power even when such computers are shut off can result in substantial energy waste.

BRIEF DESCRIPTION OF THE DRAWINGS

Some embodiments of the invention are described with respect to the following figures.

DETAILED DESCRIPTION

Figure 1:
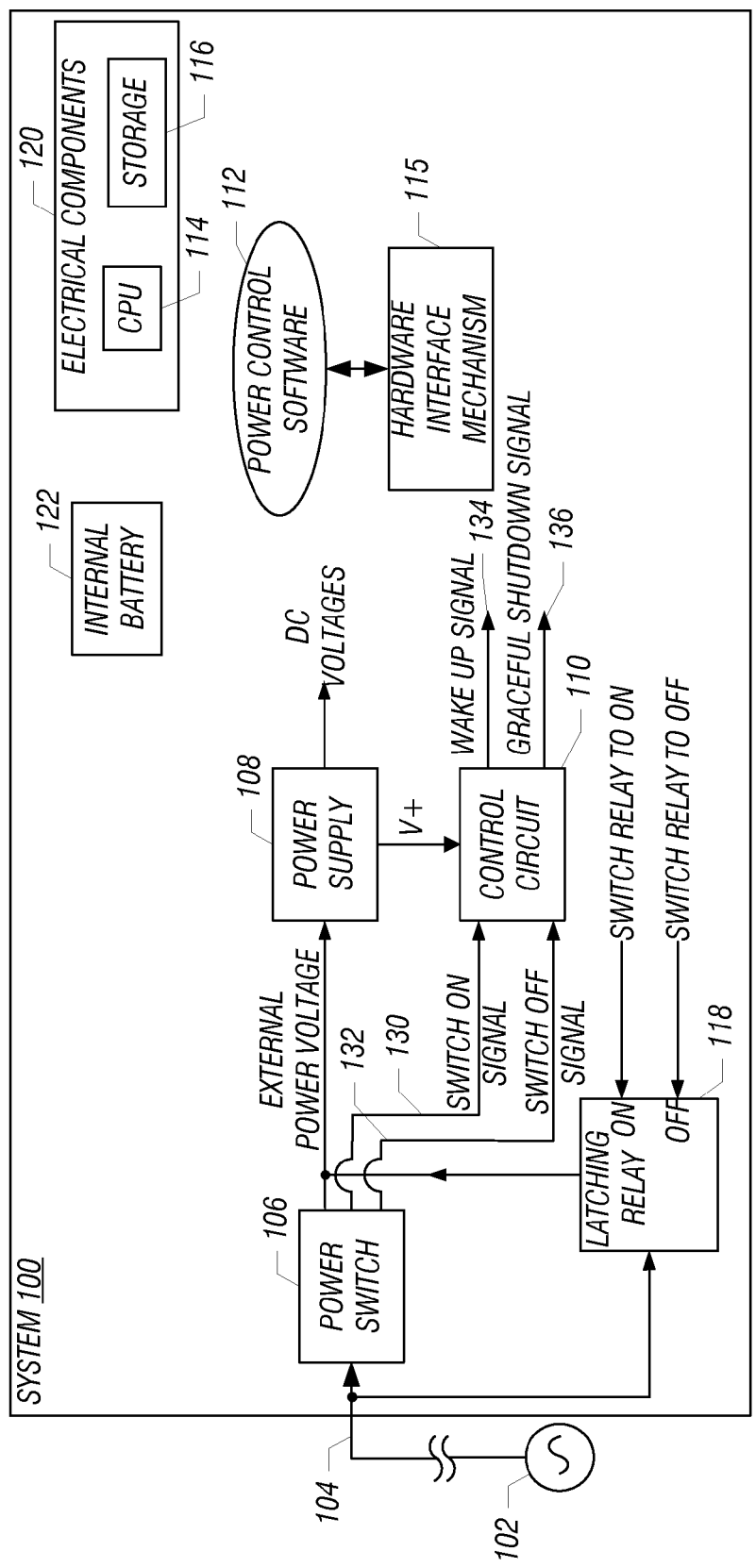
FIG. 1 is a block diagram of an exemplary system in which an embodiment of the invention is provided.

In modern computers or other electronic appliances (generally referred to as "electronic systems") that are connected to external power sources (such as an alternating current or AC power source), shutdown or hibernation of the computers does not cause the computers to be completely disconnected from the external power sources. In fact, when a conventional electronic system is shut down or placed into a hibernation state, a portion of the electronic components of the electronic system still draws power from the external power source. For example, a portion of the power supply and other circuitry will continue to run even when the electronic system is shut down or in hibernation state, and thus would continue to still draw power from the external power source.

In a world in which there are millions of electronic systems, the continued draw of power from external power sources such as AC power sources can result in substantial waste of power resources.

In accordance with some embodiments, an electronic system is provided with a power control mechanism that is able to cause electrical isolation of the electronic system from an external power source when a power switch is placed into an off state. The power control mechanism electrically connects the external power source to the electronic system when the power switch is in an on state. The electronic system also includes a power supply. When the power switch is in the on state, the external power source is electrically connected to the power supply such that the power supply can provide power voltages to electrical components of the electronic system. However, when the power switch is actuated to the off state, the electronic system is disconnected from the external power source such that the electronic system is electrically isolated from the external power source and the electronic system does not draw power from the external power source. The electronic system not drawing power from the external power source means that no active electronic component (e.g., controllers, processors, storage devices, transistors, etc.) draw power from the external power source, except possibly for small leakage currents through devices that provide electrical isolation between the electronic system and the external power source.

As noted above, one example of an external power source is an AC power source, Which can be provided by electrical wall outlets in a home or building. Alternatively, the external power source can be a generator, a battery, or any other type of power source that is external to the electronic system. By electrically isolating the electronic system from the external power source when the power switch is in the off state, the electronic system when powered off does not consume power from the external power source, such that conservation of power resources can be achieved.

The electronic system can be powered off (placed in a system off state) by shutting down the system or by placing the electronic system into a hibernation state. Shutting down the system means that power is removed from the electrical components of the electronic system without saving the state of application programs of the electronic system (in other words, the state and data associated with application programs are lost when the electronic system is shut down). On the other hand, placing the electronic system into the hibernation state causes the state and data of application programs in the electronic system to be saved to persistent storage media before power is removed from the electronic system. Upon a subsequent transition from the hibernation state to a system on state (where components of the system are active), the saved state and data of the application programs are restored such that the application programs can continue to execute as if the electronic system was never turned off.

In addition to providing a power control mechanism that electrically isolates the electronic system from an external power source when the power switch is actuated to the off state, the power control mechanism according to some embodiments also includes a control circuit that is responsive to actuation of the power switch to cause software control of a power state of the system. Software control of the power state of the system allows a graceful transition of the system between power states to avoid errors or data loss associated with power state transitions (such as may occur if actuation of the power switch causes a hard shutdown of the electronic system).

FIG. 1 is a block diagram of an exemplary electronic system 100 that incorporates an embodiment of the invention. The electronic system 100 is connected to an external power source 102 (e.g., an AC wall outlet) by an electrical link 104, which includes electrical conductors (such as electrical conductors in a power cord) to electrically connect the external power source 102 to the electronic system 100.

A power switch 106 in the electronic system 100 has an on state and an off state to connect and disconnect, respectively, the electrical components of the electronic system 100 to the external power source 102. When the power switch 106 is actuated to the off state, the electronic system 100 is electrically isolated from the external power source 102 such that the electronic system 100 does not draw power from the external power source 102. On the other hand, when the power switch 106 is actuated to the on state, the electronic system 100 is connected to the external power source 102 such that the components of the electronic system 100 can draw power from the external power source 102.

The power switch 106 can be a rocker switch or a toggle switch that has multiple positions. For example, the power switch can have an on position in which electrical contact is made between the power supply 108 and the electrical link 104 that is connected to the external power source 102. The power switch 106 also has an off position in which the power supply 108 is electrically isolated from the electrical link 104 that is connected to the external power source 102.

The electronic system 100 also includes a control circuit 110 that is connected to the power switch 106. The control circuit 110 receives a Switch On signal (130) from the power switch 106 to indicate that the power switch has been actuated to the on position. The control circuit 110 also receives a Switch Off signal (132) from the power switch 106 to indicate that the power switch 106 has been actuated to the off position. As described further below in connection with FIGS. 2 and 3, the control circuit 110 also connects an output voltage (V+) from the power supply 108 to the power switch 106.

The control circuit 110 provides output signals that cause control signals to be provided to a latching relay 118 to either switch on the latching relay 118 or switch off the latching relay 118. When switched on, the latching relay 118 is maintained (latched) in the on state to maintain a connection between the external power source 102 and the power supply 108. However, when switched off, the latching relay 118 disconnects the power supply 108 from the external power source 108.

More specifically, the control circuit 110 provides a Wake Up signal (134) that when activated is to awaken the electronic system 100 from a low power state to the system on state, and a Graceful Shutdown signal (136) that when activated is to cause the electronic system 100 to enter a system off state. The low power state of the electronic system 100 can include a shutdown state, hibernation state, or other intermediate sleep state in which there is more power draw than in the hibernation or shutdown state.

The Wake Up signal (134) and the Graceful Shutdown signal (136) can be provided to power control software 112 in the electronic system 100. In response to the Graceful Shutdown signal 136, the power control software performs graceful shutdown of the electronic system 100. "Graceful shutdown" of the electronic system refers to a transition from a power on state to a powered off state in which any running software is allowed to complete its operations before powering off such that no errors or data loss would occur. A graceful shutdown differs from a hard shutdown, in which power is removed from the electronic system before running software is allowed to complete its operations. The power control software 112 can be part of the operating system of the electronic system 100, or alternatively, the power control software 112 can be part of system firmware, such as the Basic Input/Output System (BIOS) of the electronic system 100. The power control software 112 is executable on one or more central processing units (CPUs) 114 of the electronic system 100. The CPU(s) 114 is (are) connected to storage media 116 in the electronic system 100.

The Wake Up signal (134) or the Graceful Shutdown signal (136) is provided to a hardware interface mechanism 115 that is communicatively coupled to the power control software 112. The hardware interface mechanism 115 can include an interrupt mechanism or event notification mechanism that interrupts or notifies the power control software 112 of a change in state of the Wake Up signal (134) or Graceful Shutdown signal (136). The hardware interface mechanism 115 also includes circuitry that is responsive to commands from the power control software 112 to perform requested tasks. Upon being interrupted or otherwise notified of a change in state of the Wake Up signal (134) or Graceful Shutdown signal (136), the power control software 112 performs power control tasks to cause the electronic system 100 to transition between power states.

The latching relay 118 can be switched on by a Switch Relay to On signal and switched off by a Switch Relay to Off signal. When switched on, the latching relay 118 connects an external power voltage of the external power source 102 to the power supply 108. Note that the AC voltage of the AC power source 102 may have been converted to a DC voltage prior to provision as the external power voltage to the power supply 108.

When switched off, the latching relay 118 does not electrically connect the external power source to the power supply 108. The Switch Relay to On signal can be provided by control circuit 110 and the Switch Relay to Off signal can be provided by the power control software 112.

As further shown in FIG. 1, the electronic system 100 includes various electrical components 120, including, as examples, the CPU(s) 114 and the storage media 116, as well as other components, including input/output (I/O) devices, and so forth.

The electronic system 100 also includes an internal battery 122. The internal battery 122 can be used to power certain of the electrical components 120, such as the RTC, when the power switch 106 has caused electrical isolation of the electronic system 100 from the external power source 102.

Figure 2:
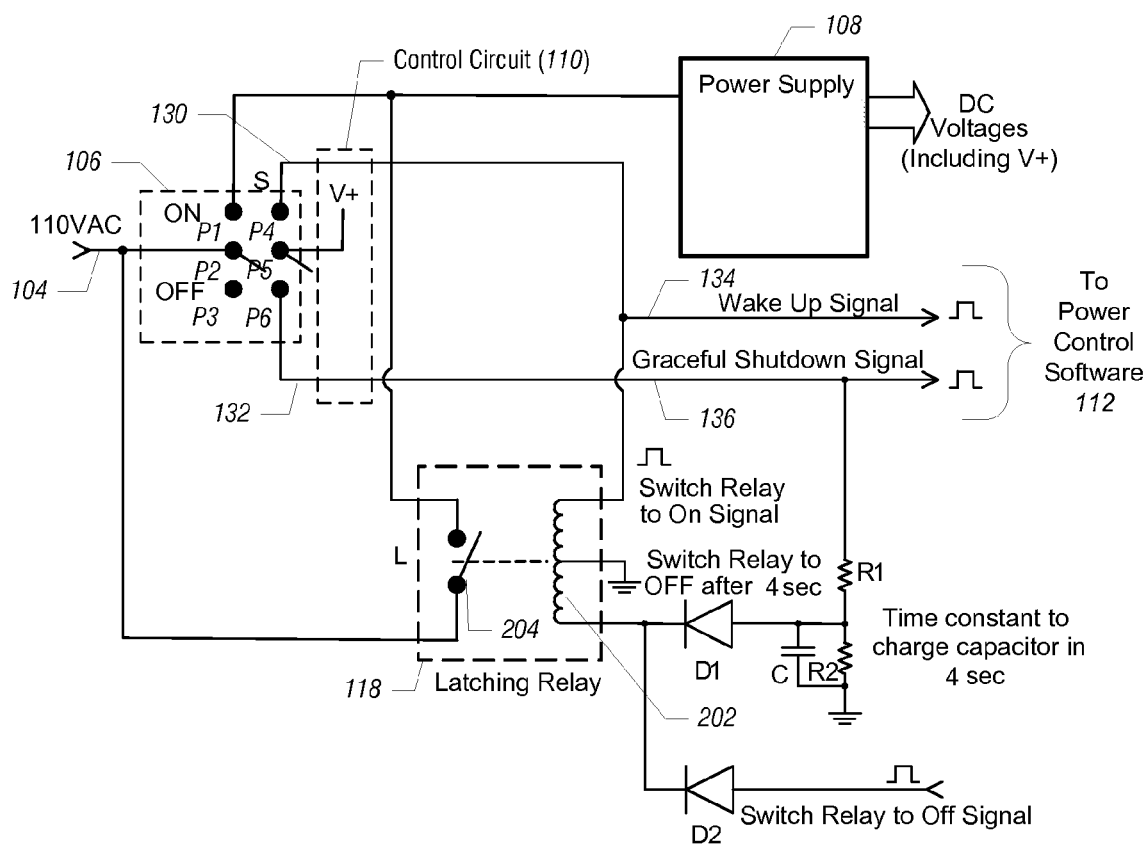
FIG. 2 is a schematic diagram of circuitry according to an embodiment.

FIG. 2 shows a power control mechanism according to an embodiment that is usable in the electronic system 100 of FIG. 1. The power control mechanism includes the power switch 106 that is connected to the electrical link 104 for connection to the external power source (102 in FIG. 1), which in one example can be an AC power source that provides external power voltage 110VAC. (Alternatively, instead of providing an AC power voltage directly to the electronic system, the 110VAC voltage can first be converted by an AC adapter to a DC voltage). The power control mechanism also includes the control circuit 110 that is connected to the power switch 106, the power supply 108, the latching relay 118, and other components shown in FIG. 2.

The power switch 106 in one example has six pins: P1, P2, P3, P4, P5, and P6. In one embodiment, the power switch 106 is a momentary rocker switch, where the switch by default (if not depressed by a user) rests at a neutral position where the pair of pins P2, P5 do not make electrical contact with either the pair of pins P1, P4 (that corresponds to the on position of the power switch 106) or to the pair of pins P3, P6 (that corresponds to the off position of the power switch 106).

The pin P2 is electrically connected to the external power voltage 110VAC, while the pin P5 is electrically connected to a voltage V+ (that is one of the DC voltages output by the power supply 108).

As shown in FIG. 2, the pin P4 provides the Switch On signal (130) to the control circuit 110, and the pin P6 provides the Switch Off signal (132) to the control circuit 110. When the power switch 106 is actuated by a user to the on position, the pair of pins P2, P5 are electrically connected to the corresponding pair of pins P1, P4, such that the external power voltage 110VAC is connected from pin P2 to pin P1, which causes the external power voltage 110VAC to be provided to the input of the power supply 108. The power supply 108 outputs DC voltages from the input voltage 110VAC.

In addition, with the power switch 106 actuated to the on position, the V+ voltage is connected from pin P5 to pin P4, which causes the Switch On signal 130 to be set to V+.

The control circuit 110 shown in FIG. 2 is made up of conductive lines that connect the Switch On signal (130) output by the power switch 106 to the Wake Up signal (134), and to the latching relay 204. The control circuit 110 also connects the Switch Off signal (132) output by the power switch 106 to the Graceful Shutdown Signal. The control circuit 110 also includes the conductive line that connects V+ to pin P4 of the power switch 106. Although the example of FIG. 2 shows the circuitry of the control circuit 110 as being made up of conductive lines, the control circuit 110 in different implementations can include other electrical components, such as resistors, buffers, and so forth.

Setting the Switch On signal (130) to V+ causes the control circuit 110 to drive the Wake Up signal 134 to V+. Note that the power switch 106 is a momentary rocker switch, such that when the user releases the power switch 106, the power switch returns it to its neutral position where pins P2, P5 are electrically isolated from corresponding pins P1, P4. With this behavior, the Wake Up signal 134 is represented as a pulse having an amplitude of V+ that will wake up the system 100 if the system 100 was in a low power state, or will cause the latching relay 204 to switch on if the system 100 was in an off state.

On the other hand, if the user actuates the power switch 106 to the off position, pin P2 is electrically contacted to pin P3, and pin P5 is electrically contacted to pin P6. As a result, the Switch Off signal 132 is set to V+; in response, the control circuit 110 drives the Graceful Shutdown signal 136 to V+. Again, since the rocker switch 106 is a momentary rocker switch, release of the power switch 106 by the user will cause the power switch to return to its neutral position, in which case pin P2 is electrically isolated from pin P3, and pin P5 is electrically isolated from pin P6. The Graceful Shutdown signal 136 is fore also a pulse having amplitude V+.

The Wake Up signal 134 and Graceful Shutdown signal 136 are provided to the power control software 112 (through the hardware interface mechanism 115 of FIG. 1).

In addition to providing the Wake Up signal 134 to the power control software 112, the Wake Up signal 134 is also provided as the Switch Relay to On signal that is provided to the "on" input of the latching relay 118. The pulse provided by the Switch Relay to On signal causes a coil 202 in the latching relay 118 to actuate a switch 204 in the latching relay 118 to the closed position. Once actuated closed, the latching relay 118 maintains the switch 204 in the closed position, which causes the external power voltage 110VAC to be maintained connected to the input of the power supply 108 even though the power switch 106 has returned to its neutral position. The latching relay 118 is able to maintain the closed position in response to a momentary input pulse (at the Switch Relay to On signal) of at least a predefined time duration (e.g., 30 milliseconds or more). The latching relay 118 maintains the switch 204 closed with no additional power at the coil 202, until the Switch Relay to Off signal is received by the latching relay 118. Similarly the latching relay 118 is able to maintain the open position in response to a momentary input pulse (at the Switch Relay to Off signal) of at least a predefined time duration (e.g., 30 milliseconds or more). The latching relay 118 maintains the switch 204 open with no additional power at the coil 202, until the Switch Relay to On signal is received by the latching relay 118.

In response to the user actuating the power switch 106 to the off position, the Graceful Shutdown signal 136 is provided to the power control software 112, which causes the power control software 112 to cause the Switch Relay to Off signal to be pulsed. The Switch Relay to Off signal is pulsed after the power control software 112 has performed actions to gracefully power down the electrical components of the electronic system 100. The Switch Relay to Off signal is provided through a diode D2 to the "off" input of the latching relay 118. In response to the Switch Relay to Off signal, the coil 202 of the latching relay 118 opens the switch 204, to thereby disconnect the input of the power supply 108 from the external power voltage 110VAC.

As seen in FIG. 2, when the power switch 106 is actuated to the off position, electrical isolation is provided since both the power switch 106 and latching relay 118 electrically isolate components of the electronic system 100 from the external power source 102 such that the electronic system 100 does not draw power from the external power source 102.

In addition to graceful shutdown based on power control provided by the power control software 112, the power control mechanism of FIG. 2 also allows for a hard shutdown based on the user depressing the power switch 106 to the off position for greater than some predetermined time interval (e.g., greater than 4 seconds or some other predefined time interval.

To provide this hard shutdown feature, the Graceful Shutdown signal 136 is provided to a time constant circuit made of a resistors R1, R2, and capacitor C. The combination of the resistors R1 and R2 and capacitor C defines a time constant, which can be a time constant of 4 seconds (or some other time constant). If the Graceful Shutdown signal 136 is set high (V+) for greater than this time constant interval, then the input of diode D1 would be set high (V+), which is transferred through the diode D1 to the "off" input of the latching relay 118 to cause the latching relay 118 to open the switch 204 to thereby disconnect the input of the power supply 108 from the external power voltage 110VAC. Although the depicted time constant circuit is made up of capacitor C, resistors R1, R2 and diodes D1, the time constant circuit can be implemented using other electronic components depending on the impedance of the latching relay 204 and other component parameters.

Figure 3:
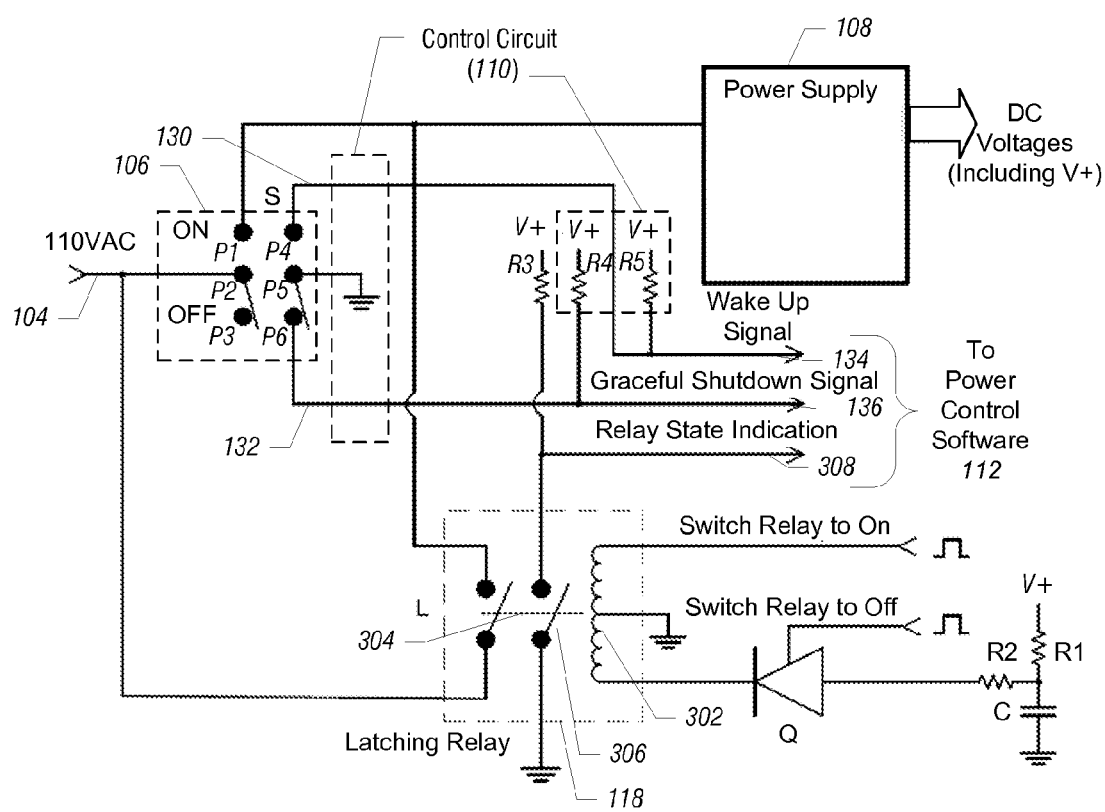
FIG. 3 is a schematic diagram of circuitry according to another embodiment.

FIG. 3 is a schematic diagram of another embodiment of a power control mechanism. In the power control mechanism of FIG. 3, the power switch 106 used is a non-momentary rocker switch that does not have the neutral position of the momentary rocker switch shown in FIG. 2. The non-momentary rocker switch 106 has two positions, an on position and an off position. In the on position, pin P2 is electrically contacted to pin P1, and pin P5 is electrically contacted to pin P4, On the other hand, in the off position, pin P2 is electrically contacted to pin P3, and pin P5 is electrically contacted to pin P6. Once switched to the on position or the off position, the non-momentary rocker switch 106 remains in the on position or off position, respectively.

In FIG. 3, the control circuit 110 is made up of the elements shown in two dashed boxes, including a conductive line between the Switch On signal 130 and the Wake Up signal 134 and another conductive line between the Switch Off signal 132 and the Graceful Shutdown signal 136. The control circuit 110 also includes a conductive line between pin P5 and ground. In addition, the control circuit 110 includes resistors R4 and R5 that electrically connect the Graceful Shutdown signal 136 to V+ and the Wake Up signal 134 to V+, respectively.

When the power switch 106 is actuated to the on position, the external power voltage 110VAC is electrically connected to the input of the power supply through pins P2 and P1, and the Switch On signal 130 is electrically connected to ground. This sets the Wake Up signal 134 at the ground voltage. When the power switch 106 is actuated to the off position, the Switch Off signal 132 is pulled from V+ to ground, which causes the Graceful Shutdown signal 136 to be pulled from V+ down to ground.

The Wake Up signal and the Graceful Shutdown signal 136 are provided to the power control software 112 (through the hardware interface mechanism 115 of FIG. 1). In response to the Wake Up signal or Graceful Shutdown signal, the power control software 112 either provides a pulsed Switch Relay to On signal to the "on" input of the latching relay 118, or provides a pulsed Switch Relay to Off signal to the gate input of transistor Q. More specifically, in response to activation of the Wake Up signal 134 (indicated by the Wake Up signal 134 being at the ground voltage), the power control software 112 causes the Switch Relay to On signal to be pulsed high, which causes a coil 302 in the latching relay 118 to close switches 304 and 306.

On the other hand, in response to activation of the Graceful Shutdown signal 136 (indicated by the signal transitioning from V+ to low), the power control software 112 causes the Switch Relay to Off signal to be pulsed high, which causes the transistor Q to couple the input voltage V+ to the output of the transistor Q, which is connected to the "off" input of the latching relay 118. This causes the coil 302 in the latching relay 118 to open the switches 304 and 306.

Closing of the switch 304 in the latching relay 118 causes the external power voltage 110VAC to be electrically connected to the input of the power supply 108. Closing of the switch 306 causes a Relay State Indication 308 to be pulled low from V+ (through resistor R30. The Relay State Indication 308 can be provided as an indication to the power control software 112 to indicate that the state of the latching relay 118 has changed. The Relay State indication 308 when pulled low indicates that the latching relay 118 has been activated to the closed state (both switches 304 and 306 are closed). On the other hand, the Relay State Indication 308 when pulled high (V+) indicates that the latching relay 118 has been deactivated to the on state (both switches 304 and 304 open).

Figure 4:
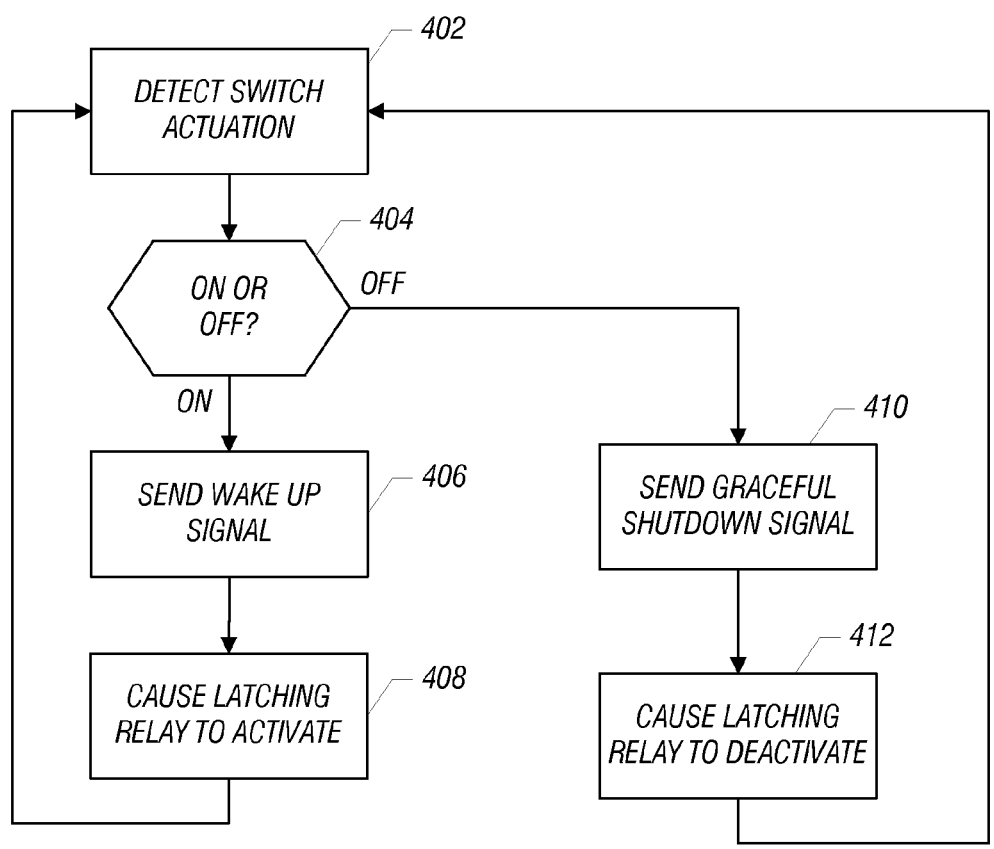
FIG. 4 is a flow diagram of a process of power control according to an embodiment.

FIG. 4 is a flow diagram of a process of power control according to an embodiment. Actuation of the power switch 106 is detected (at 402) by the power control mechanism (depicted in FIG. 2 or 3). Next, the power control mechanism determines whether the power switch 106 has been actuated to the on position or off position. If actuated to the on position, the power control mechanism activates the Wake Up signal (134), which is seat (at 406) to the power control software 112 and/or the latching relay 118. In response, the Switch Relay to On signal is activated to cause (at 108) the latching relay 118 to close to electrically connect the external power voltage to the power supply 108 of the electronic system 100.

If the power control mechanism determines (at 404) that the power switch 106 has been actuated to the off position, the power control mechanism activates the Graceful Shutdown signal (136), which is sent (at 410) to the power control software 112 and/or the latching relay 118. In response, the Switch Relay to Off signal is activated to cause (at 412) the latching relay 118 to open to electrically isolate the external power voltage from the power supply 108.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A system comprising:
   electrical components;
   a power supply to provide power to the electrical components;
   a momentary power switch to connect an external power source that is external to the system to the power supply, wherein the power switch has an on position, an off position, and a neutral position, and wherein the power switch if actuated to the off position causes the system to be electrically isolated from the external power source, wherein the power switch is to return to the neutral position after actuation to the on position;
   a latching relay to maintain electrical connection between the external power source and the power supply in response to actuation of the power switch to the on position, wherein the latching relay is to maintain electrical connection between the external power source and the power supply even though the power switch has returned to the neutral position; and
   a control circuit responsive to actuation of the power switch to the on position to provide a signal generated from a voltage provided by the power supply, the signal to cause machine-readable instructions to awaken the system from a system off state, and wherein the control circuit is to further provide the signal to the latching relay to actuate the latching relay to maintain the electrical connection.

2. The system of claim 1, wherein the power switch if actuated to the off position causes electrical isolation of the system from the external power source such that the system does not draw power from the external power source.

3. The system of claim 2, wherein the electrical isolation of the system from the external power source prevents the electrical components from drawing power from the external power source, and wherein the power switch if actuated to the on position causes power from the external power source to be connected to the electrical components.

4. The system of claim 1, wherein the power switch when actuated to the on position is to cause the voltage provided by the power supply to be connected to a first input of the latching relay to cause closing of the latching relay.

5. The system of claim 1, wherein in response to actuation of the power switch to the off position, the latching relay is caused to be opened to electrically isolate the external power source from the power supply.

6. The system of claim 5, further comprising power control machine-readable instructions, wherein the power control machine-readable instructions are executable to perform graceful shutdown of the system in response to actuation of the power switch to the off position, and to activate a signal to open the latching relay in response to actuation of the power switch to the off position.

7. The system of claim 5, further comprising a time constant circuit that defines a time constant, wherein the latching relay is to open to cause a hard shutdown of the system in response to actuation of the power switch to the off position for longer than the time constant.

8. The system of claim 1, further comprising the machine-readable instructions, wherein the machine-readable instructions are responsive to the signal to transition the system from a first power state to a second, different power state.

9. The system of claim 8, wherein the first power state is the system off state, and the second power state is a system on state.

10. The system of claim 1, wherein the power switch comprises:
a first pin to be connected to the external power source, and a second pin connected to the voltage provided by the power supply; and
contacts connected to the first and second pins and actuated to connect the external power source to an input of the power supply, and the voltage provided by the power supply to the signal, in response to the power switch being actuated to the on position, and
the contacts actuated to connect the voltage provided by the power supply to a signal for transitioning the system to the system off state, in response to the power switch being actuated to the off position.

11. A method of power control in a system, comprising:
detecting, by a control circuit, actuation of a momentary power switch to an off position, the power switch having the off position, a neutral position, and an on position, and the power switch is to return to the neutral position after actuation to the on position or the off position;
performing graceful shutdown of the system in response to actuation of the power switch to the off position;
electrically isolating the system from an external power source after performing the graceful shutdown of the system;
detecting actuation of the power switch to an on position;
in response to detecting actuation of the power switch to the on position,
connecting the external power source to a power supply in the system, wherein the power supply provides an output voltage in response to being connected to the external power source;
generating, by a control circuit, an activation signal from the output voltage of the power supply, the activation signal to cause machine-readable instructions to transition the system to a system on state; and
providing the activation signal to a latching relay to close the latching relay to maintain electrical connection between the external power source and the power supply, wherein the latching relay is to maintain electrical connection between the external power source and the power supply even though the power switch has returned to the neutral position from the on position.

12. The method of claim 11, wherein electrically isolating the system from the external power source comprises opening a switch in the latching relay to isolate components in the system from the external power source.

13. A power control apparatus for use in a system, comprising:
a momentary power switch having an on position, an off position, and a neutral position, wherein the power switch is to return to the neutral position after actuation to the on position or the off position;
a latching relay, wherein the latching relay is to be closed in response to actuation of the power switch to the on position to maintain electrical connection between an external power source and a power supply of the system, and the latching relay to maintain electrical connection between the external power source and the power supply even though the power switch has returned to the neutral position, wherein the latching relay is to be opened in response to actuation of the power switch to the off position to electrically isolate the external power source from the power supply; and
a control circuit to:
cause electrical connection between the external power source and the system in response to actuation of the power switch to the on position,
cause electrical isolation between the external power source and the system in response to actuation of the power switch to the off position,
assert a signal in response to actuation of the power switch to the on position, the signal generated from a voltage provided by the power supply and to cause machine-readable instructions to transition the system from a system off state to a system on state, wherein the control circuit is to further provide the signal to the latching relay to actuate the latching relay to maintain the electrical connection between the external power source and the power supply.

14. The power control apparatus of claim 13, wherein the signal is a first signal, and the control circuit is to activate a second signal to cause the system to transition to the system off state.

15. The power control apparatus of claim 13, wherein the power switch comprises:
a first pin to be connected to the external power source, and a second pin to be connected to the voltage provided by the power supply; and
contacts connected to the first and second pins and actuated to connect the external power source to an input of the power supply, and the voltage provided by the power supply to the signal, in response to the power switch being actuated to the on position, and
contacts actuated to connect the voltage provided by the power supply to a signal for transitioning the system to the system off state, in response to the power switch being actuated to the off position.

* * * * *